United States Patent [19]

Onmori

[11] Patent Number: 4,726,467
[45] Date of Patent: Feb. 23, 1988

[54] MAGNETIC RECORDING TAPE CASSETTE
[75] Inventor: Shozo Onmori, Kanagawa, Japan
[73] Assignee: Fuji Photo Film Co., Ltd., Kanagawa, Japan
[21] Appl. No.: 37,279
[22] Filed: Apr. 10, 1987
[30] Foreign Application Priority Data
   Apr. 10, 1986 [JP] Japan .............................. 61-53870[U]
[51] Int. Cl.⁴ ........................................... B65D 85/672
[52] U.S. Cl. ..................................... 206/387; 16/126;
   16/381; 220/343
[58] Field of Search ................. 206/387; 220/343, 342;
   16/126, 381

[56]      References Cited
    U.S. PATENT DOCUMENTS 2,347,981  5/1944  Apfelbaum ......................... 220/343
   4,422,550 12/1983  Okamura ............................ 206/387
   4,533,093  8/1985  Gelardi et al. ................... 206/387 X Primary Examiner—William Price
Attorney, Agent, or Firm—Sughrue, Mion, Zinn, Macpeak and Seas

[57]      ABSTRACT

A magnetic recording tape cassette comprises a pair of hubs around which a magnetic recording tape is wound and which are accommodated in a casing. The casing is provided with an access opening through which the magnetic recording tape is drawn out for recording or reproduction and a lid member supported for rotation between a closed position in which it closes the access opening and an open position in which it opens the same by way of a pair of pivots which are formed on opposite ends of the lid member and are rotatably received in respective holes formed in the walls of the casing perpendicular to the access opening. At least one of the pivots is provided with a slit extending along the longitudinal axis thereof. The hole or holes for receiving the pivot provided with the slit are arranged to support the pivot at three points.

2 Claims, 5 Drawing Figures

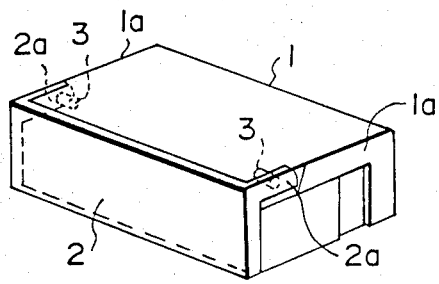
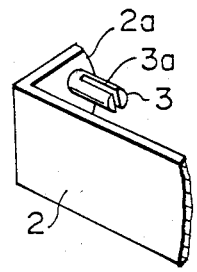
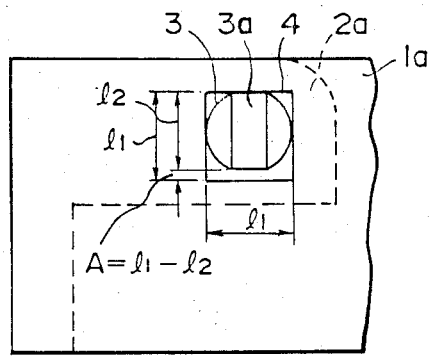
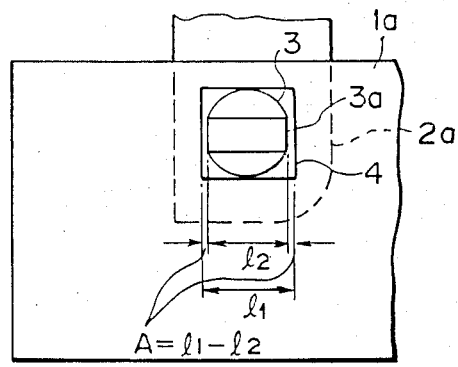

MAGNETIC RECORDING TAPE CASSETTE

BACKGROUND OF THE INVENTION

1. Field of the Invention

This invention relates to a magnetic recording tape cassette.

2. Description of the Prior Art

Conventionally, a magnetic recording tape cassette of the type having a pair of take-up hubs generally has a structure as shown in FIG. 3. In FIG. 3, reference numeral 1 denotes a casing of the cassette, and the casing 1 is provided, on one side thereof, with an access opening through which the magnetic recording tape accommodated in the casing 1 is drawn out for recording or reproduction by a magnetic recording and reproducing system such as a tape recorder. The access opening is closed by a lid member 2 while not in use. The lid member 2 is mounted for rotation on the casing 1 by pivots 3 which inwardly project from arms 2a integrally formed on opposite sides of the lid member 2 and are received for rotation in holes 4 formed in opposed sides of the casing 1 perpendicular to the side in which the access opening is formed as shown in FIGS. 4 and 5. At least one of the pivots 3 is provided with a slit 3a extending along the longitudinal axis in order to facilitate assembly. Each of the holes 4 has a square cross section each side of which has a length substantially equal to the outer diameter of the pivot 3, and the lid member 2 is urged upward by a spring (not shown).

However, the conventional magnetic recording disk cassette is disadvantageous on the following points. As shown in FIG. 5, the dimension $l_2$ of the pivot 3 as measured along the slit 3a is smaller than the outer diameter $l_1$ of the pivot 3, and accordingly, if the length of each side of the hole 4 in which the pivot 3 is to be received is selected to be equal to the outer diameter $l_1$ of the pivot 3, a space A having a width substantially equal to $l_1-l_2$ is formed between the lower surface of the pivot 3 and the lower side of the hole 4 since the lid member 2 is spring-urged upward, whereby a large space is formed between the lower surface of the arm 2a of the lid member 2 and the upper surface of the casing 1 to adversely affect the external appearance of the cassette. Further, for a similar reason, the lid member 2 is movable back and forth with respect to the casing 1 when the lid member 2 is opened, which is not preferred.

SUMMARY OF THE INVENTION

In view of the foregoing observations and description, the primary object of the present invention is to provide a magnetic recording tape cassette free from the drawbacks inherent to the conventional magnetic recording tape cassette described above.

In accordance with the present invention, there is provided a magnetic recording tape cassette comprising a pair of hubs around which a magnetic recording tape is wound and which are accommodated in a casing having an access opening through which the magnetic recording tape is drawn out for recording or reproduction and a lid member supported for rotation between a closed position in which it closes the access opening and an open position in which it opens the same by way of a pair of pivots which are formed on opposite ends of the lid member and are rotatably received in respective holes formed in the walls of the casing perpendicular to the access opening, at least one of the pivots being provided with a slit extending along the longitudinal axis thereof, characterized in that the hole or holes for receiving the pivot provided with the slit are arranged to support the pivot at three points.

BRIEF DESCRIPTION OF THE DRAWINGS

FIG. 3 is a perspective view showing the external appearance of the conventional magnetic recording tape cassette, FIG. 4 is an enlarged fragmentary perspective view showing a part of the conventional magnetic recording tape cassette, FIG. 5 is a view similar to FIG. 1 but showing a part of the conventional magnetic recording tape cassette, and FIG. 6 is a view similar to FIG. 2 but showing a part of the conventional magnetic recording tape cassette.

DESCRIPTION OF THE PREFERRED EMBODIMENT

Figure 1:
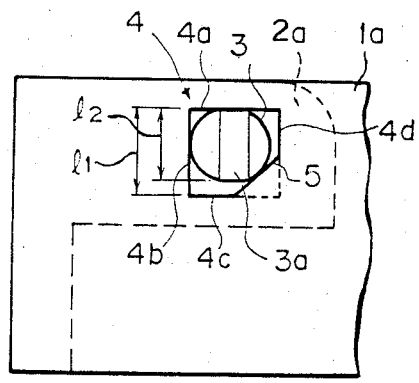
FIG. 1 is an enlarged fragmentary view showing a part of a magnetic recording tape cassette in accordance with an embodiment of the present invention with the lid member in the closed position.
Figure 2:
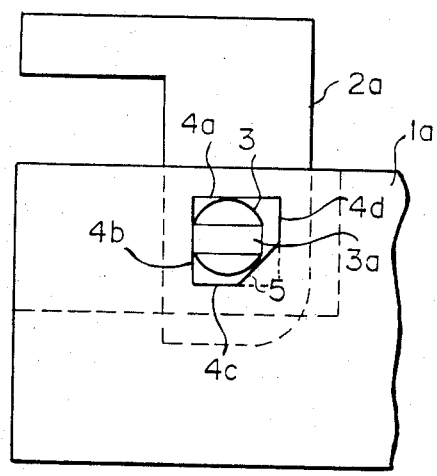
FIG. 2 is a view similar to FIG. 1 but with the lid member in the open position.

In FIGS. 1 and 2, the parts analogous to the parts shown in FIGS. 3 to 6 are given the same reference numerals and will not be described here. The most important feature of the present invention lies in the shape of the hole 4. The slit 3a is formed in the pivot 3 to extend substantially in perpendicular to the upper surface of the casing 1 when the lid member 2 is in the open position. The shape of the hole 4 is a modification of a square having four sides 4a to 4d of a length slightly larger than the outer diameter $l_1$ of the pivot 3. More specifically, a square of such dimensions is modified by provision of a slant abutment side extending from an intermediate portion of the lower horizontal side 4c to an intermediate portion of the vertical side 4d remote from the access opening of the casing 1, and the pivot 3 is in contact with the hole 4 at three points, a point on the upper vertical side 4a, a point on the vertical side 4b on the side of the access opening of the casing 1 and a point on the slant abutment side 5.

When the lid member 2 is in the closed position shown in FIG. 1, the pivot 3 is supported for rotation by the upper horizontal side 4a, the vertical side 4b and the slant abutment side 5 and accordingly movement of the pivot 3 almost in any direction other than rotation is inhibited. Also in the open position shown in FIG. 2, the pivot 3 is supported for rotation by the upper horizontal side 4a, the vertical side 4b and the slant abutment side 5 though the points at which the pivot 3 is in contact with these sides change and accordingly movement of the pivot 3 almost in any direction other than rotation is inhibited. The pivot 3 is thus constantly supported at the three points free from the play of the lid member 2 inherent to the conventional cassette. Thus, the space formed between the arm 2a of the lid member 2 and the upper surface of the casing 1 when the lid member 2 is in the closed position is minimized, and back and forth movement of the lid member 2 with respect to the casing 1 when the lid member 2 is in the open position is reduced.

The shape of the hole 4 is not be limited to that shown in FIGS. 1 and 2 and may be of any shape that enables the hole to support the pivot 3 at three points.

I claim:

1. A magnetic recording tape cassette comprising a pair of hubs around which a magnetic recording tape is wound and which are accommodated in a casing having an access opening through which the magnetic recording tape is drawn out for recording or reproduction and a lid member supported for rotation between a closed position in which it closes the access opening and an open position in which it opens the same by way of a pair of pivots which are formed on opposite ends of the lid member and are rotatably received in respective holes formed in the walls of the casing perpendicular to the access opening, at least one of the pivots being provided with a slit extending along the longitudinal axis thereof, characterized in that the hole or holes for receiving the pivot provided with the slit are arranged to support the pivot at three points.

2. A magnetic recording tape cassette as defined in claim 1 in which the cross-sectional shape of said hole for receiving the pivot provided with the slit is a modified square having four sides each of a length slightly larger than the outer diameter of the pivot, the modification being the provision of a slant abutment side extending from an intermediate portion of one of the sides to an intermediate portion of one of the sides adjacent thereto.

* * * * *